(12) United States Patent
Tylaska

(10) Patent No.: US 9,994,328 B2
(45) Date of Patent: Jun. 12, 2018

(54) PARACHUTE PACKING TOOL

(71) Applicant: Timothy T. Tylaska, Preston, CT (US)

(72) Inventor: Timothy T. Tylaska, Preston, CT (US)

( * ) Notice: Subject to any disclaimer, the term of this patent is extended or adjusted under 35 U.S.C. 154(b) by 338 days.

(21) Appl. No.: 14/795,925

(22) Filed: Jul. 10, 2015

(65) Prior Publication Data

US 2016/0009401 A1    Jan. 14, 2016

Related U.S. Application Data

(60) Provisional application No. 62/022,710, filed on Jul. 10, 2014.

(51) Int. Cl.
*B23P 19/04* (2006.01)
*B64D 17/46* (2006.01)
*B64D 17/40* (2006.01)

(52) U.S. Cl.
CPC ............ *B64D 17/46* (2013.01); *B64D 17/40* (2013.01)

(58) Field of Classification Search
USPC ............................ 29/241; 244/142, 147, 148
See application file for complete search history.

(56) References Cited

U.S. PATENT DOCUMENTS

| | | | | |
|---|---|---|---|---|
| 1,899,713 A * | 2/1933 | Nichols | ................. | B64D 17/52 |
| | | | | 244/148 |
| 2,357,805 A | 9/1944 | Bloxon | | |
| 2,357,828 A * | 9/1944 | Hurt | ....................... | B64D 17/00 |
| | | | | 244/148 |
| 5,080,600 A | 1/1992 | Baker et al. | | |
| 6,932,300 B2 * | 8/2005 | Kumar | ................... | B64D 17/46 |
| | | | | 244/148 |
| 8,066,766 B2 | 11/2011 | To et al. | | |
| 8,276,311 B2 | 10/2012 | Cowin | | |
| 8,328,141 B2 | 12/2012 | Caldwell | | |
| 2002/0131661 A1 * | 9/2002 | Johnson | ................ | F16C 35/063 |
| | | | | 384/537 |
| 2009/0085365 A1 * | 4/2009 | Ehrhard | ................ | A45F 5/1026 |
| | | | | 294/158 |

* cited by examiner

*Primary Examiner* — Joseph J Hail
*Assistant Examiner* — Shantese McDonald
(74) *Attorney, Agent, or Firm* — William B. Ritchie

(57) ABSTRACT

A tool to aid with pulling a closing loop cord through grommets in closing flaps on a parachute container. The cord is looped in a "U" shaped arrangement with two pulling "legs" of equal length being wrapped around a handle to provide a better grip. Only one leg of the cord can be permanently attached to the handle as the other leg must be removable for fishing through the grommets. The handle must have a diameter to permit passage through the eye of the grommet with the two legs of the cord trailing behind. With existing handles, the removable end of the cord slides off the end of the handle when passing through the grommet. An "O" ring placed on one or both ends of a radial groove in the handle holds the cord captive when passing the handle through the grommets to prevent the cord from sliding off.

8 Claims, 10 Drawing Sheets

PARACHUTE PACKING TOOL

This application claims benefit of U.S. Provisional Application Ser. No. 62/022,710 filed Jul. 10, 2014, pursuant to 35 USC § 119(e).

FIELD OF THE INVENTION

The invention relates to tools, in particular, a tool to aid with pulling the closing loop of a parachute through the grommets of the closing flaps on a parachute container.

BACKGROUND OF INVENTION

The proper closing of the flaps on a parachute requires the feeding of the closing loop through the eye of the grommets in each of the closing flaps on a typical parachute container. The closing loop is basically a short section of spectra type line with a single eye spliced into its free end, and the other end permanently attached to the inside of the parachute container.

In order to properly pack the parachute into the container, this closing loop must be fished through the grommets of the container's flaps, and each flap must be folded into place.

Typical sport parachutes generally use four of such flaps on the container. The feeding of this closing loop through the small holes of the grommets in the flaps is usually accomplished by first fishing a cord or line through the eye of the flap grommet, then through the spliced eye of the closing loop, and then back through the eye of the flap grommet again.

The cord or line used to pull the closing loop through the grommets is usually referred to as a pull-up cord, and is, generally, a foot or two in length. This pull-up cord is looped in a "U" shaped manner so that the center of its length contacts the closing loop, and each of the two equal length legs of the pull-up cord come back through the grommet. Pulling on both legs of this pull-up cord subsequently pulls the spliced eye of the closing loop through the grommet. A fairly substantial amount of pulling force is required to pull this pull-up cord through the grommet as the contained parachute is also being compressed inside the container. The process is repeated again for each of the flaps whereas the looped pull-up cord needs to be subsequently fished though the grommet of each flap and the closing loop pulled through each subsequent grommet. Once the closing loop has been fished through the grommet of the final flap, a curved pin known as the closing pin is then inserted through the spliced eye of the closing loop. This closing pin keeps the flaps from springing back open until it is time to deploy the parachute.

Due to the substantial force required to pull the pull-up cord through the flap grommets, the operation usually requires the full strength of both arms of the packer and a substantial grip on the pull-up cord. As a result, it is known in the prior art to attach a short bar to the ends of the looped pull-up cord so as to provide a handle to pull upon. This handle can only be permanently attached to one end of the looped pull-up cord as the other end needs to be removable so that it can be fished through the eye of the closing loop. Once the free end of the looped pull-up cord has been fished through the eye of the closing loop, it is then slipped back onto the other end of the handle. The handle is made small enough in diameter so that it can pass lengthwise through the eyehole of the flap grommet. The handle, with one end of the looped pull-up cord permanently attached and the other end of the looped pull-up cord temporarily attached but removable, is then passed in its entirety through the eye hole of the flap grommet, with the two legs of the pull-up cord trailing behind. Force is then applied to the handle and the eye of the closing loop is pulled through the flap grommet whereas the flap is then folded down into place.

In the process of passing the handle with the attached looped pull-up cord through the eye of the flap grommet, there becomes the problem of the removable end of the looped pull-up cord slipping off the handle due to friction or impingement of the pull-up cord with the inside surface of the flap grommet. Due to the high forces involved, the packer is usually using both hands to pack the container and does not have a spare hand to prevent the pull-up cord from sliding off the handle.

The prior art solution to this issue has been to merely cut a small radial groove around the diameter of the handle and splice an eye on the removable end of the pull-up cord. This spliced eye is then slipped into the radial groove to help prevent it from sliding off the handle. However, due to the need to orient the pulling handle in such a direction that it can be passed lengthwise through the grommet, for a short time, the pull-up cord becomes pulled at right angles to the radial direction of the handle's groove. Any friction created by the action of the pull-up cord rubbing against the inside surface of the grommet causes a force that results in the pull-up cord slipping out of this radial groove. The pull-up cord then either slides off the end of the handle completely or becomes entangled with the other leg of the pull-up cord. This problem sometimes leads to the need to repeat the entire strenuous flap closing process over again, leading to fatigue on the packer and reducing the number of parachutes that the packer can complete without a rest break.

The need to restrain the movement of a spliced eye of a cord in a groove is normally not a problem that requires a novel solution as; generally, the load can be applied to the same radial direction as the groove, thus preventing the eye from ever slipping out of the groove. In the unique situation of the handle of the parachute packing tool, such load is applied perpendicular to the radial direction of the groove during the brief operation of passing the tool through the flap grommet. A novel method is required to restrain the spliced eye from slipping out of such groove, but such a restraining device must not be so overly strong that the spliced eye cannot still be removed from the groove with reasonable force when so desired.

The typical prior art method of pulling on the closing loop for packing a parachute currently consists of using a looped pull-up cord and handle with just a basic radial groove for the removable end of the looped pull-up cord to seat into. Such devices are sold by parachute equipment suppliers such as made by "PARAGEAR" and "CHUTING STAR" and are referred to as "closing tools" or "power tools" and have been in existence for decades. However, none of such existing devices implement a feature to keep the spliced eye of the removable end of the looped pull-up cord from slipping out of this radial groove.

U.S. Pat. No. 6,932,300, issued to Kumar discloses a device for closing a parachute pack. This invention uses a lever and crank mechanism to provide a mechanical advantage in the pulling of the closing loop though the grommets. While this disclosure relates to pulling on the closing loop of a parachute, it requires the need of an awkward expensive mechanism to accomplish this task.

U.S. Pat. No. 2,357,828 issued to Hurt discloses a tool for use in packing parachutes and is adapted for holding and drawing up the pull-up cord used to facilitate the closing of the pack. The Hurt disclosure consists of another lever and pivot-type assembly that sits on the parachute pack and mechanically pulls the closing loop. While it also pertains to the pulling of the closing loop through the grommets, again, it requires the use of additional expensive mechanical mechanisms.

U.S. Pat. No. 2,357,805, issued to Bloxon also discloses a tool for closing parachute packs and consists of a wheel and threaded axle to provide the mechanical advantage for pulling on the closing loop. It, again, provides another solution to the problem of packing a parachute.

U.S. Pat. No. 8,066,766, issued to To et al. discloses various methods of cinching a tether used in minimally invasive surgery procedures. While unrelated to the packing of parachutes, the invention pertains to the restraining of a tether, which could be compared to the pull-up cord used for parachute packing. This reference describes numerous restrain methods and one such method describes a tether passed through an "O" ring type component. However, the tether is described as passing axially through the center of the compressible ring with the outsides of the ring compressed radially onto the tether. This is a different restraining technique altogether and does not describe a restraining technique of wedging a cord between an "O" ring and a groove wall.

U.S. Pat. No. 8,276,311, issued to Cowin discloses a means of adjustably and reversibly engaging a fishing line at an engagement position along another line. The invention relates to a slidable collar and other approaches of restraining a line against another line and does not pertain to constraining the spliced eye of a cord to a rod.

U.S. Pat. No. 8,328,141, issued to Caldwell discloses a tool for aiding with the stowing of the suspension lines on a parachute. The tool does not address the issue of pulling the closing loop of the parachute.

U.S. Pat. No. 5,080,600, issued to Baker et al. discloses an electrical connector assembly utilizing an "O" ring such that the connector breaks open at certain tension levels. However, the invention does not utilize the "O" ring in a fashion similar to that described on the proposed invention.

There is not found in the prior art an easy solution of this problem of the pull-up cord slipping out of the radial groove in the handle when pulling the handle to close a parachute's flaps.

SUMMARY OF THE INVENTION

The invention solves the problem of the removable end of the looped pull-up cord from inadvertently slipping off the handle by using a wider than normal groove in the handle and inserting an "O" ring or other such compressible material into one or both ends of the groove. The groove width and O-ring dimensions are made to specific dimensions based upon the closing loop cord thickness. With the invention, when the spliced eye of the removable end of the looped pull-up cord is slipped into the radial slot in the pulling handle, the pull-up cord wedges itself in between the edge of the "O" ring or other compressible material and the opposing edge of the groove or opposing "O" ring. The removable leg of the pull-up cord thus becomes pinched in the groove of the handle and is held captive to it. This pinching force provides just enough resistance to keep the looped end of the pull-up cord captive with the handle as it is passed through the eye of the flap grommet, but is of a low enough force so as to still allow the looped end to be easily pulled back off the handle so that it can eventually be removed when the closing pin has been inserted. The proposed invention solves the age-old problem of the pull-up cord slipping off the pull handle and greatly improves the speed and efficiency of quickly closing the flaps on a parachute.

It is an aspect of the invention to provide a parachute packing tool for the pulling of the closing loop through the grommets of the closing flaps on.

It is a further aspect of the invention to provide a parachute packing tool such that the removable end of the looped pull-up cord is held captive to the handle of the tool during use, but can also be removed with a reasonable amount of force so as to allow the removable end of the looped pull-up cord to be fished through the eye of the closing loop.

It is a further aspect of the invention to provide a parachute packing tool that has a radial groove and an "O" ring or other compressible material seated against the wall of one or both sides of the radial groove.

Another aspect of the invention is to provide a parachute packing tool with a defined clearance gap between the edge of the "O" ring or compressible material and the edge of the radial groove or opposing "O" ring such as to allow the pull-up cord to wedge itself between the side of the "O" ring and the side of the radial groove or opposing "O" ring and be held captive to the pulling handle by such pinching action.

Still another aspect of the invention is to provide a parachute packing tool such that the wedged pull-up cord can still be removed from this pinch point with a reasonable amount of force.

It is also an aspect of the invention to provide a parachute packing tool with multiple "O" rings having different cross sectional shapes to provide a better gripping force or surface on the restrained pull-up cord.

Finally, it is an aspect of the invention to provide a parachute packing tool having an alternate configuration of the radial groove in the tool handle by using a groove with an undercut or reverse taper to provide a better gripping force and locking action on the restrained cord.

DETAILED DESCRIPTION OF THE INVENTION

The present invention presents a tool for pulling the closing loop of a parachute through the closing flap grommets. The apparatus prevents the removable end of the looped pull-up cord from sliding off the pulling handle during the brief operation of when the handle must be passed axially through the closing flap grommet, yet still allows this removable end of the looped pull-up cord to be removable with reasonable force.

Figure 1:
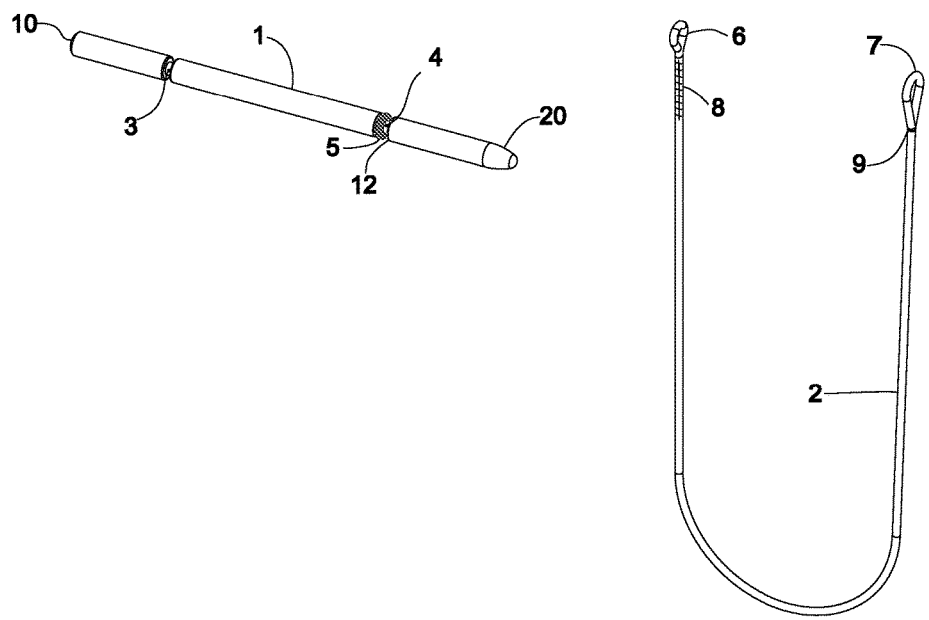
FIG. 1 is a view of the invention in its preferred embodiment showing the pulling handle and looped pull-up cord as separate entities for clarity.

FIG. 1 shows the invention in its preferred embodiment showing pulling handle 1 and looped pull-up cord 2 as separate entities for clarity. Pulling handle 1 has front rounded nose 20 and rear flat end 10 as is typical with the existing state of the art pulling handles available today. Pulling handle 1 also contains rear radial groove 3 and front radial groove 4, which is also typical with existing handles. However, with the present invention, front radial groove 4 is made wider than the groove width of existing handles so as to fit the width of "O" ring 5 and still contain additional unused width. Groove 4 also contains an exposed edge 12. "O" ring 5 or other similarly pliable material is inserted into front radial groove 4 by forcing "O" ring 5 over front rounded nose 20 and back into front radial groove 4 whereas it springs back into place. Looped pull-up cord 2 contains spliced fixed eye 6 made permanent by side stitching 8. Looped pull-up cord 2 also contains another spliced eye 7 on its opposite end that may or may not be made permanent by a similar side stitching. Spliced eye 7 is normally created by using a "finger trap" type splice 9 whereas the inner section of cord 2 is passed back through its outer tubular sheath as is again typical with pull-up cords today.

Figure 2:
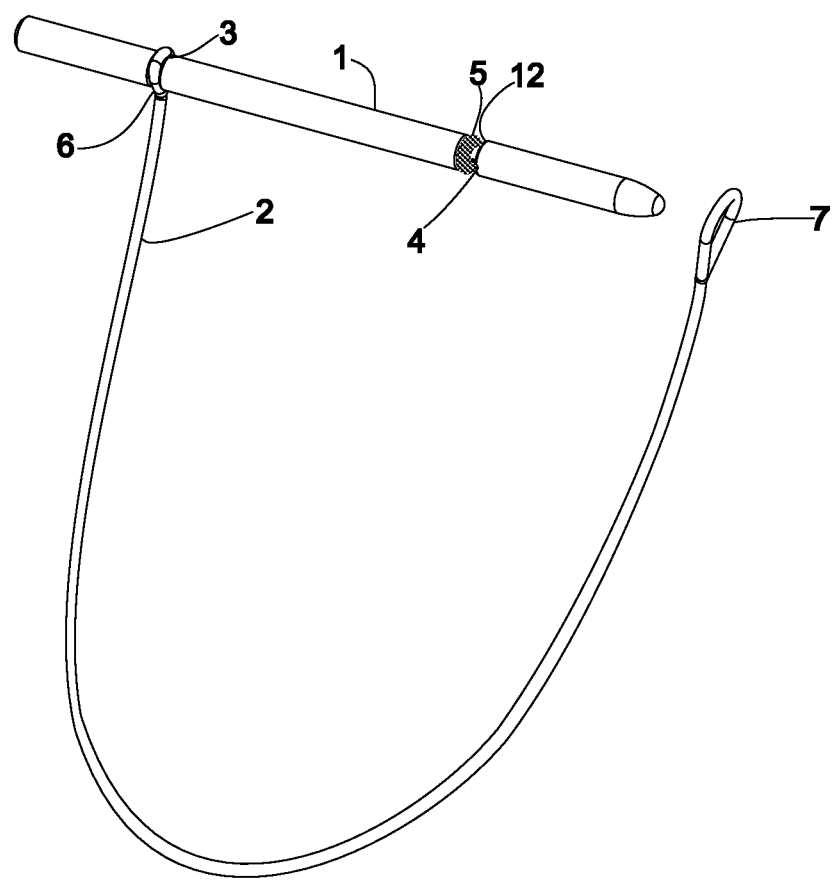
FIG. 2 is a view of the invention with the looped pull-up cord permanently attached at one end of the pull handle of the closing tool and the other end of the looped pull-up cord unattached to the tool.

FIG. 2 shows pulling handle 1 with spliced fixed eye 6 of looped pull-up cord 2 seated into rear radial groove 3 of pulling handle 1. Spliced eye 7 is shown unattached to pulling handle 1 in this particular view.

Figure 3:
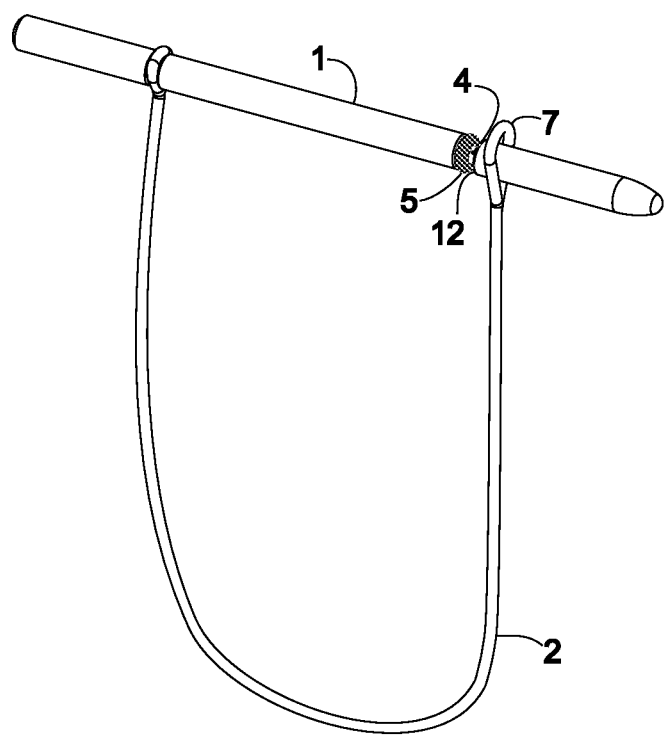
FIG. 3 is a view of the invention with the looped pull-up cord permanently attached at one end of the pull handle of the closing tool and the other end of the looped pull-up cord adjacent to the radial groove and ready to be seated between the "O" ring and the radial groove in the tool.

FIG. 3 shows pulling handle 1 with spliced eye 7 of looped pull-up cord 2 in a position just about to be seated into groove 4. With further pulling, spliced eye 7 of looped pull-up cord 2 will seat itself into groove 4 and become pinched between the edge of "O" ring 5 and the exposed edge 12 of groove 4.

Figure 4:
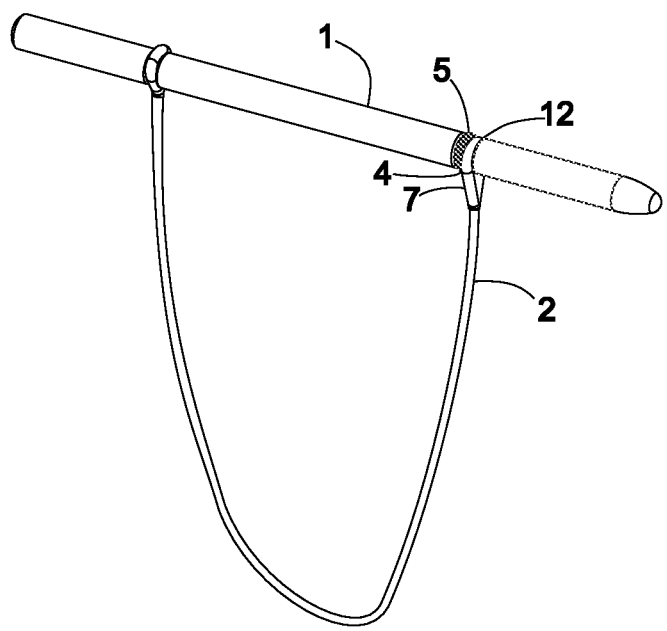
FIG. 4 is a view of the invention with the looped pull-up cord permanently attached at one end of the pull handle of the closing tool and the other end of the looped pull-up cord now wedged between the radial groove and seated "O" ring in the tool.

FIG. 4 shows pulling handle 1 with spliced eye 7 of looped pull-up cord 2 now seated in groove 4. Spliced eye 7 is now held captive in groove 4 by the friction from the squeezing action of "O" ring 5 against the edge of spliced eye 7 on one side, and exposed edge 12 of groove 4 on its other side.

Figure 5:
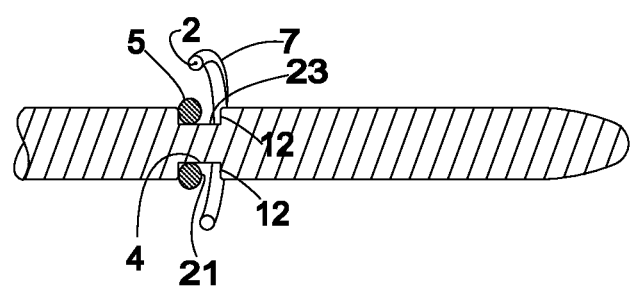
FIG. 5 is a detailed sectional view of the looped pull-up cord as it is about to be seated and wedged between the "O" ring and the opposite wall of the radial groove of the pulling handle of the closing tool.

FIG. 5 is a detailed view of groove 4, "O" ring 5 and exposed edge 12. A sectional view of spliced eye 7 is shown just as it is about to become wedged and pinched between exposed edge 21 of "O" ring 5 and exposed edge 12 of groove 4. The width of groove 4 is dimensioned such that when "O" ring 5 is inserted, there is a remaining free width 23 which is slightly less than the cross sectional diameter width of pull-up cord 2 used to make spliced eye 7.

Figure 6:
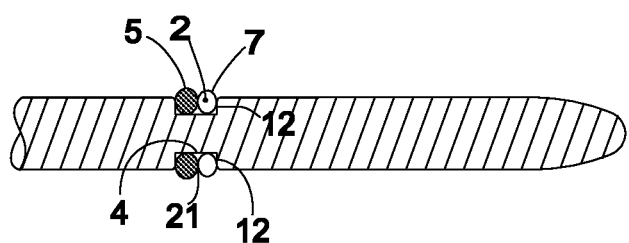
FIG. 6 is a detailed view of the looped pull-up cord as it is seated and wedged between the "O" ring and the opposite wall of the radial groove in the pulling handle of the closing tool.

FIG. 6 is a detailed sectional view of the groove 4, "O" ring 5 and exposed edge 12 with the spliced eye 7 of the looped pull-up cord 2 now pinched between the edge 21 of the "O" ring 5 and exposed edge 12 of groove 4.

Figure 7:
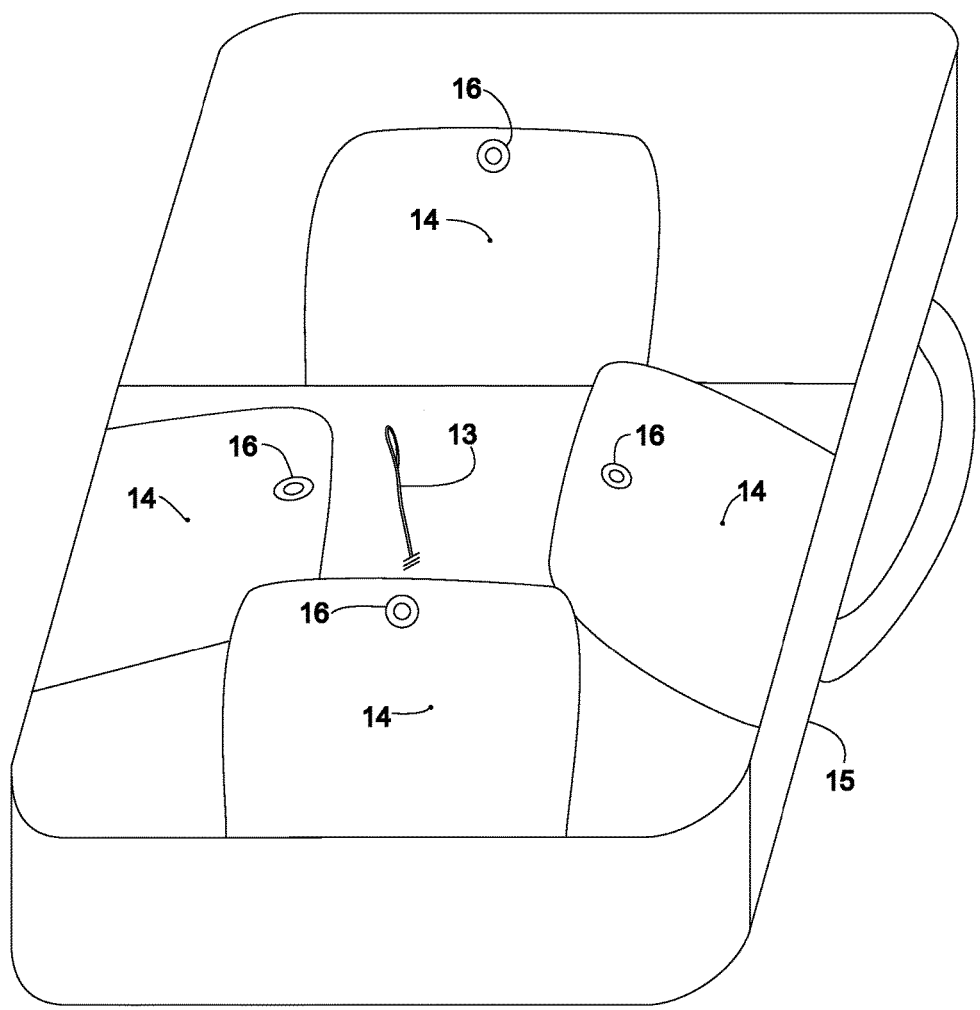
FIG. 7 is a view of a typical parachute container with flaps and closing loop.

FIG. 7 shows typical container 15 with closing flaps 14 and closing flap grommets 16. Closing loop 13 is also shown.

Figure 8:
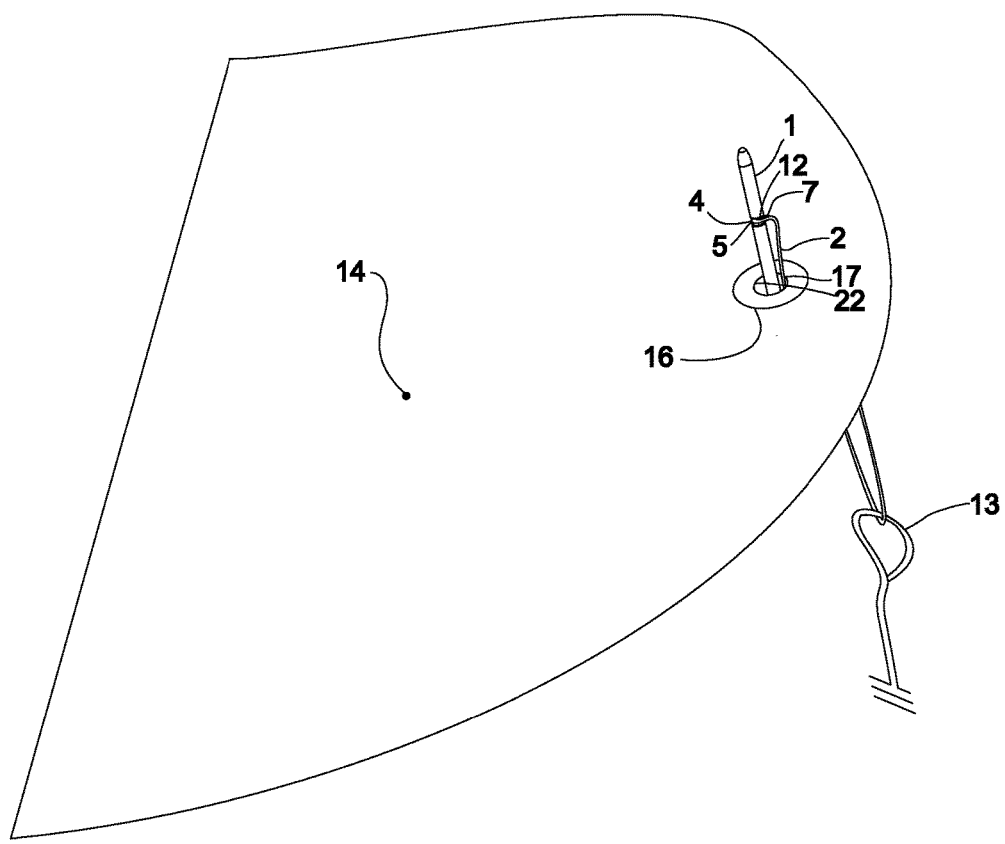
FIG. 8 is a view of the invention being used to pull the closing loop through a grommet of a typical parachute container.

FIG. 8 is a detailed view of typical closing flap 14 and shows the pulling handle 1 being passed through grommet 16. Spliced eye 7 of looped pull-up cord 2 is shown held captive to pulling handle 1 by the pinching action of "O" ring 5 against spliced eye 7 and the exposed edge 12 of groove 4. FIG. 8 also shows how frictional force 17 created because of the rubbing action of the edge of looped pull-up cord 2 against inside edge 22 of grommet 16 would normally act to pull spliced eye 7 out of groove 4 if it were not for the pinching action of "O" ring 5 keeping spliced eye 7 captive to pulling handle 1.

Figure 9:
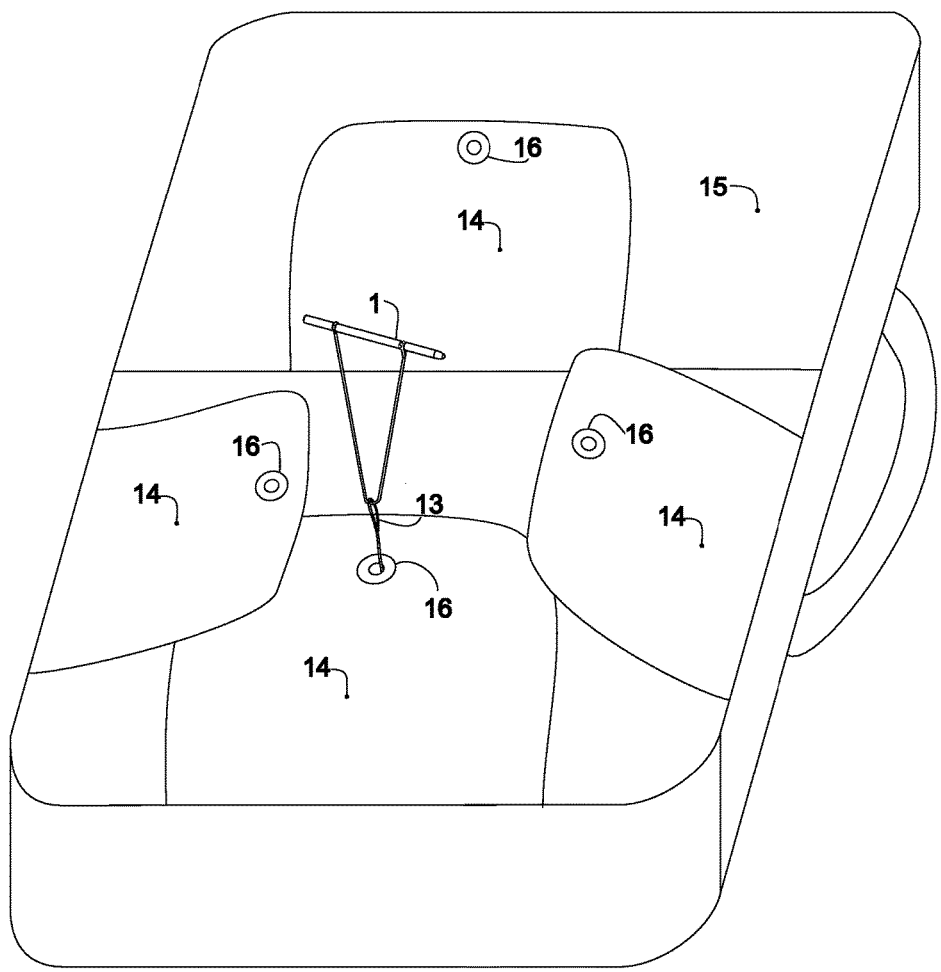
FIG. 9 shows the pulling handle and closing loop already passed through the flap grommet.

FIG. 9 is a view of the pulling handle 1 and closing loop 13 already passed through grommet 16 of flap 14 of container 15.

Figure 10:
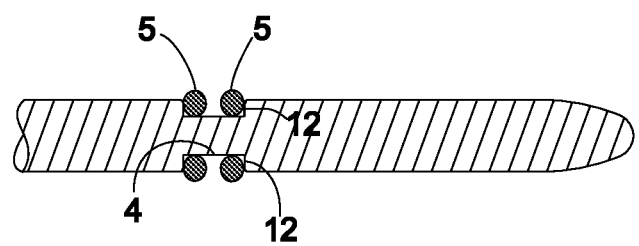
FIG. 10 is a detailed sectional view of the tool handle's radial groove with a multiple of "O" rings or compressible material on both ends of the radial groove such that the pull-up cord can wedge between the opposing "O" rings or compressible material.

FIG. 10 shows a detailed sectional view of the tool handle radial groove 4 with a multiple of "O" rings 5 or other compressible material on both ends of the radial groove 4. In this arrangement the spliced eye 7 of the pull-up cord 2 is pinched between the opposing "O" rings 5 or compressible material.

Figure 11:
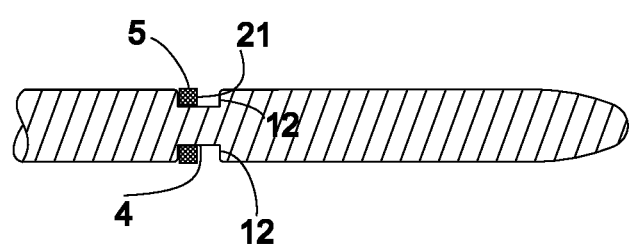
FIG. 11 is a detailed sectional view of the tool handle's radial groove with an "O" ring or other compressible material possessing a cross-sectional geometry other than the standard circular geometry of a typical "O" ring so as to provide a better gripping contact surface with the pull-up cord.

FIG. 11 shows a detailed sectional view of the tool handle radial groove 4 with an "O" ring 5 or other compressible material possessing a cross sectional geometry other than the standard circular geometry of a typical toroid shaped "O" ring. This noncircular cross section provides a better gripping contact surface between the edge 21 of the "O" ring 5 or compressible material and the sliced eye 7 of pull-up cord 2 than may be obtained using an "O" ring 5 or compressible material with a standard circular cross sectional area. Such noncircular cross sectional geometry could be square, polygonal, configured with an undercut, or other various geometries to provide a better gripping surface.

Figure 12:
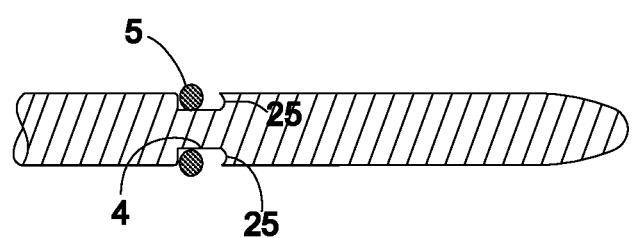
FIG. 12 is a detailed sectional view of the tool handle radial groove with the wall of the radial groove undercut so as to better grip the pull-up cord.

FIG. 12 is a detailed sectional view of the tool handle radial groove 4 showing the wall of the radial groove 4 with undercut 25. Undercut 25 of radial groove 4 provides a better gripping surface on the spliced eye 7 of pull-up cord 2 than a typical square edge radial groove 4.

Although the present invention has been described with reference to certain preferred embodiments thereof, other versions are readily apparent to those of ordinary skill in the preferred embodiments contained herein.

What is claimed is:

1. The parachute packing tool for a parachute having a container with a plurality of closing flaps with a grommet in each flap and having a closing loop with an eye spliced into the free end of said closing loop that is fed through each of the grommets of said flaps, said parachute packing tool comprising:

a handle having a rounded end and a flat end and a having a diameter that permits passage through the grommet in each of said closing flaps, said handle further comprising a front radial groove having a width and depth in said handle adjacent to the rounded end and a rear radial groove having a width and depth in said handle adjacent to the flat end of said handle; wherein said front radial groove has a front edge and a rear edge such that said front edge is oriented towards the rounded end of said handle and said rear edge is oriented towards the flat end of said handle;

a pull-up cord with a diameter corresponding to the width and depth of said front radial groove and having a first spliced eye at one end of said pull-up cord that can be releasably attached to the front radial groove of said handle such that said handle and said pull-up cord may be inserted through the eye of said closing loop and the grommet of each of said closing flaps;

a first circumferential ring of compressible material having a width wherein said first ring of compressible material is inserted in said front radial groove of said handle such that said first ring is against the eye of said pull-up cord and has the width of said ring that is substantially less than the width of said front radial groove such that when the first spliced eye of said pull-up cord is placed within said front radial groove;

a second circumferential ring of compressible material having a width wherein said second circumferential material is inserted in said front radial groove of said handle such that said second circumferential ring of compressible material is against the front edge of said front radial groove and has a width of said second ring that is substantially less than the width of said front radial groove such that when the first spliced eye of said pull-up cord is placed between said first and second circumferential rings in said front radial groove, the spliced eye of said pull-up cord is pinched firmly between said first and said second circumferential rings of compressible material but releasably held.

2. The parachute packing tool of claim 1 wherein the front edge of said first groove is undercut to provide a better gripping surface than provided by a square edge radial groove.

3. The parachute packing tool of claim 1 wherein said first circumferential ring is an O-ring.

4. The parachute packing tool of claim 1 wherein the cross-sectional shape of said first circumferential ring and said second circumferential ring of compressible material have a cross-sectional shape selected from the group consisting of a circle, square, or polygon.

5. The parachute packing tool of claim 1 wherein said rear radial groove of said handle is identical to said front radial groove and wherein the second circumferential ring of compressible material is inserted therein such that said second circumferential ring of compressible material is identical to said first circumferential ring of compressible material.

6. The parachute packing tool of claim 1 wherein said pull-up cord having a second spliced eye at the other end of said pull-up cord that is adapted to be inserted within said rear radial groove of said handle.

7. The parachute packing tool of claim 6 wherein said second spliced eye of said pull-up cord is adapted to be releasable within said rear radial groove of said handle.

8. The parachute packing tool of claim 6 wherein said second spliced eye of said pull-up cord is adapted to be permanently attached within said rear radial groove of said handle.

\* \* \* \* \*